Aug. 11, 1931. L. STALDER 1,818,170
DEFLECTING MECHANISM
Filed Nov. 19, 1927

INVENTOR
Louis Stalder
BY
ATTORNEY

Patented Aug. 11, 1931

1,818,170

UNITED STATES PATENT OFFICE

LOUIS STALDER, OF TURTLE CREEK, PENNSYLVANIA, ASSIGNOR TO WESTINGHOUSE ELECTRIC & MANUFACTURING COMPANY, A CORPORATION OF PENNSYLVANIA

DEFLECTING MECHANISM

Application filed November 19, 1927. Serial No. 234,413.

My invention relates to deflecting mechanisms such for example, as may be utilized for indicating the pressure of a liquid medium.

In accordance with my invention, a deflecting member, magnetically biased to a predetermined position, is moved or actuated in accordance with changes in a condition of a dimensional fluid quantity, such as a liquid or gaseous medium.

Further, in accordance with my invention, a deflecting member, having a vane of magnetizable material movable therewith, is controlled or actuated by a magnetized member movable with respect to, and coacting with, said vane.

Further, in accordance with my invention, a vane of magnetizable material for controlling the movement of a deflecting member is positioned between the poles of a permanent magnet, and a magnetized member, preferably of U-shape, coacts with said vane and is carried by a pressure-responsive diaphragm.

My invention resides in the mechanism and features of construction of the character hereinafter described and claimed.

Figure 1:
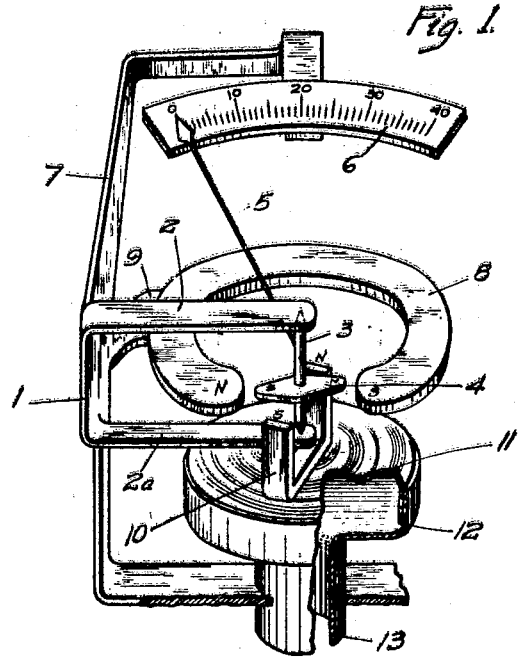
Figure 2:
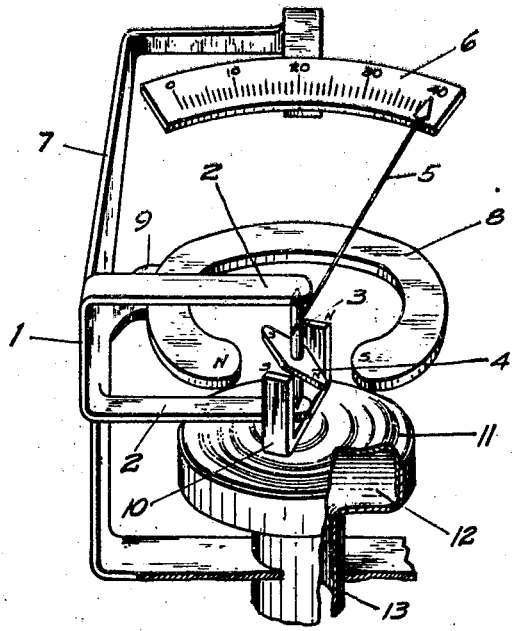

For an illustration of one of the forms my invention may take, reference is to be had to the accompanying drawings, in which, Figure 1 is a perspective view of a deflecting mechanism constructed in accordance with my invention, and Fig. 2 is a view similar to Fig. 1, but showing the parts in another position.

In the drawings, is illustrated a frame or supporting member 1 comprising a pair of spaced arms 2, 2a of suitable non-magnetic material and on which is journalled a shaft 3 having a preferably elliptical or diamond-shaped vane or member 4 secured thereto and rotatable therewith.

Carried by the movable structure, comprising the shaft 3 and vane 4, is a pointer or deflecting member 5 coacting with, or playing over, a suitable scale 6 which may be carried by a member 7 pertaining to the frame 1.

The vane 4 is of suitable magnetizable material, as soft iron, and, in the example shown, is disposed in a magnetic field produced by a permanent magnet 8 which may be supported by an extension 9 of the frame 1.

Coacting with the vane 4 to change the position thereof, is a magnetizable member or structure 10 which is movable in accordance with changes in a condition of some quantity. In the example shown, member 10 is of U-shape, or substantially so, and, with the pointer 5 at its zero position, as indicated in Fig. 1, said member 10 is disposed substantially at right angles to the long axis of the vane 4, with the tips of the U-arms disposed well below the plane of magnet 8 and said vane 4.

In accordance with my invention, the member 10 is supported by a diaphragm 11, preferably formed of phosphor bronze, or the like. Diaphragm 11 is circumferentially corrugated and forms a part of the wall structure of a chamber 12 with which one end of a conduit 13 communicates, the other end thereof communicating with a chamber containing a fluid under pressure, such, for example, as the casing of an internal-combustion engine in which the lubricating liquid is under pressure.

As stated, the member 10 of U-shape, is one that is magnetizable. By preference, it is formed from material of high coercivity such, for example, as cobalt steel, which is magnetized and thereafter retains its magnetism indefinitely. With the lower face of diaphragm 11 subjected to zero pressure, the hereinbefore described mechanism assumes the position illustrated in Fig. 1, in which case, the pointer 5 is at its zero position. However, upon increase of pressure of the medium within chamber 12, diaphragm 11 is moved upwardly, (Fig. 2) to greater and greater extent. The magnetized member 10 likewise is moved upwardly and, as a result, the vane 4 is influenced by a second magnetic field, i. e., the one existing between the poles of said magnetized member 10 and which is displaced with respect to the magnetic field between the poles of the permanent magnet 8. Accordingly, movement is imparted to the vane 4, shaft 3, and pointer 5, the latter moving in a clockwise direction (Figs. 1 and 2) to an extent depending upon the magnitude of the pressure in chamber 12.

When the conduit 13 contains oil under pressure, the scale 6 may be suitably calibrated, for example, in pounds per square inch. Obviously, the calibration of scale 6 may be such as is suitable or desirable in view of the quantity, the changes in a condition of which are being observed.

It should be understood that my invention has been illustrated only in an elementary manner and that, in actual practice, the apparatus to be utilized may depart widely from that shown on the drawings.

I claim as my invention:

1. The combination with a deflecting member biased to a predetermined position, and a vane of magnetizable material movable therewith, of a magnetized member coacting with said vane, and a diaphragm by which said magnetized member is carried.

2. The combination with a deflecting member biased to a predetermined position, and a vane of magnetizable material movable therewith, of a magnetized member coacting with said vane, and a circumferentially corrugated diaphragm by which said magnetized member is carried.

3. The combination with a deflecting member biased to a predetermined position, and a vane of magnetizable material movable therewith, of a U-shaped magnetized member coacting with said vane, and a diaphragm by which said magnetized member is carried.

4. The combination with a deflecting member biased to a predetermined position, and a vane of magnetizable material movable therewith, of a U-shaped magnetized member of cobalt steel coacting with said vane, and a diaphragm by which said magnetized member is carried.

5. The combination with a deflecting member, a vane of magnetizable material, and a permanent magnet between the poles of which said vane is disposed, of a U-shaped magnetized member coacting with said vane, and a diaphragm by which said magnetized member is carried.

6. In combination, a pivotally-mounted magnetizable vane, a permanent magnet disposed in fixed relation thereto for biasing the same toward predetermined positions, a movable fluid-pressure-responsive member, and a permanent magnet carried by said member and movable thereby parallel to the pivot axis of said vane to move said vane relative to said position about said axis in accordance with fluid-pressure changes.

7. In combination, a pivotally-mounted magnetic flux-responsive element, means for biasing the same toward predetermined positions, a member movable in response to changes in a quantity, and a flux-producing element movable by said member relative to said flux-responsive element to cause movement of the latter about its pivot axis.

8. In combination, a magnetic flux-responsive pivotally-movable element, a plurality of flux-producing elements, and means for moving one of said elements relative to another in the direction of the pivot axis of said flux-responsive movable element to cause said flux-responsive movable element to move about said axis in accordance with a resultant effect of said flux-producing means.

9. The combination with a movable magnetizable element biased independently of the earth's magnetic field toward a predetermined position, of magnetic-flux-producing means for moving said element, and means responsive to variations in a quantity for moving said flux-producing means.

10. The combination with a movable magnetizable element biased independently of the earth's magnetic field toward a predetermined position, of means for producing a constant magnetic flux for affecting said element, and means responsive to variations in a quantity for varying the effect of said flux on said element independently of the value of said flux.

11. The combination with a movable magnetizable element and a permanent magnet for controlling the movement thereof, of means including another permanent magnet providing the sole moving influence on the element responsive to variations in a quantity for moving the element in accordance with said variations.

12. The combination with a movable magnetizable element and a permanent magnet for controlling the movement thereof, of another permanent magnet, and means responsive to variations in a quantity for moving the second permanent magnet to cause the element to move.

13. The combination with a movable magnetizable element, of a plurality of means each producing a magnetic flux of constant value and relatively movable in response to variations in a quantity for moving said element in accordance with said variations.

14. The combination with a movable magnetizable element, of a plurality of means each producing a magnetic flux of constant value, and means responsive to variations in a quantity for moving said flux-producing means relatively to move the element.

In testimony whereof, I have hereunto subscribed my name this 10th day of November, 1927.

LOUIS STALDER.